United States Patent
Schwartz et al.

(10) Patent No.: US 11,816,760 B2
(45) Date of Patent: *Nov. 14, 2023

(54) ADDING AUGMENTED REALITY TO A SUB-VIEW OF A HIGH RESOLUTION CENTRAL VIDEO FEED

(71) Applicant: Tempus Ex Machina, Inc., San Francisco, CA (US)

(72) Inventors: Erik Schwartz, Los Altos Hills, CA (US); Michael Naquin, Alamo, CA (US); Christopher Brown, Atlanta, GA (US); Steve Xing, San Francisco, CA (US); Pawel Czarnecki, San Francisco, CA (US); Charles D. Ebersol, Atlanta, GA (US); Anne Gerhart, Atlanta, GA (US)

(73) Assignee: Tempus Ex Machina, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,829

(22) Filed: Dec. 15, 2022

(65) Prior Publication Data

US 2023/0122102 A1 Apr. 20, 2023

Related U.S. Application Data

(63) Continuation of application No. 17/381,877, filed on Jul. 21, 2021, now Pat. No. 11,587,266.

(51) Int. Cl.
*G06T 11/00* (2006.01)
*G06V 20/40* (2022.01)

(52) U.S. Cl.
CPC .............. *G06T 11/00* (2013.01); *G06V 20/49* (2022.01)

(58) Field of Classification Search
None
See application file for complete search history.

(56) References Cited

U.S. PATENT DOCUMENTS

| | | |
|---|---|---|
| 2012/0062732 A1 | 3/2012 | Marman |
| 2015/0339842 A1 | 11/2015 | Gay |
| 2019/0391778 A1 | 12/2019 | Asai |
| 2020/0236288 A1 | 7/2020 | Schwartz |
| 2021/0319587 A1 | 10/2021 | Sha |
| 2021/0400201 A1 | 12/2021 | Schwartz |

*Primary Examiner* — Robert J Craddock
(74) *Attorney, Agent, or Firm* — Van Pelt, Yi & James LLP

(57) ABSTRACT

Techniques are disclosed to add augmented reality to a sub-view of a high resolution central video feed. In various embodiments, a central video feed is received from a first camera on a first recurring basis and time-stamped position information is received from a tracking system on a second recurring basis. The central video feed is calibrated against a spatial region encompassed by the central video feed. The received time-stamped position information and a determined plurality of tiles associated with at least one frame of the central video feed are used to define a first sub-view of the central video feed. The first sub-view and a homography defining placement of augmented reality elements on the at least one frame of the central video feed are provided as output to a device configured to use the first sub-view and the homography display the first sub-view.

20 Claims, 7 Drawing Sheets

ADDING AUGMENTED REALITY TO A SUB-VIEW OF A HIGH RESOLUTION CENTRAL VIDEO FEED

CROSS REFERENCE TO OTHER APPLICATIONS

This application is a continuation of U.S. patent application Ser. No. 17/381,877 entitled ADDING AUGMENTED REALITY TO A SUB-VIEW OF A HIGH RESOLUTION CENTRAL VIDEO FEED filed Jul. 21, 2021 which is incorporated herein by reference for all purposes.

BACKGROUND OF THE INVENTION

Conventional camera tracking systems typically track an object via manual operation of a camera focused on an object of interest or an analysis of the subject matter that is captured by each respective camera. In a first typical method, an object is tracked manually by a camera operator, who ensures that the object is always within a frame of view. In a second typical method, a series of images is captured by a camera, and these images are analyzed to determine optical characteristics of an object that is tracked, such as identifying a color associated with the object or a silhouette of the object. These optical characteristics are recognized in further images, allowing the object to be tracked through the progression of the series of images.

In the first example method, numerous resources such as equipment and camera operators are required to effectively track different types of objects. In the second example method, the conventional systems are susceptible to losing track of the object if the object quickly darts out of a line of sight of the camera or if there are multiple objects in the line of sight of the camera that are optically similar to the desired object. Both example methods are typically not tailored to individual viewer interests and are more commonly found in broadcast media for a general audience. Thus, there is a need for improved object tracking and display systems.

BRIEF DESCRIPTION OF THE DRAWINGS

Various embodiments of the invention are disclosed in the following detailed description and the accompanying drawings.

DETAILED DESCRIPTION

Figure 1:
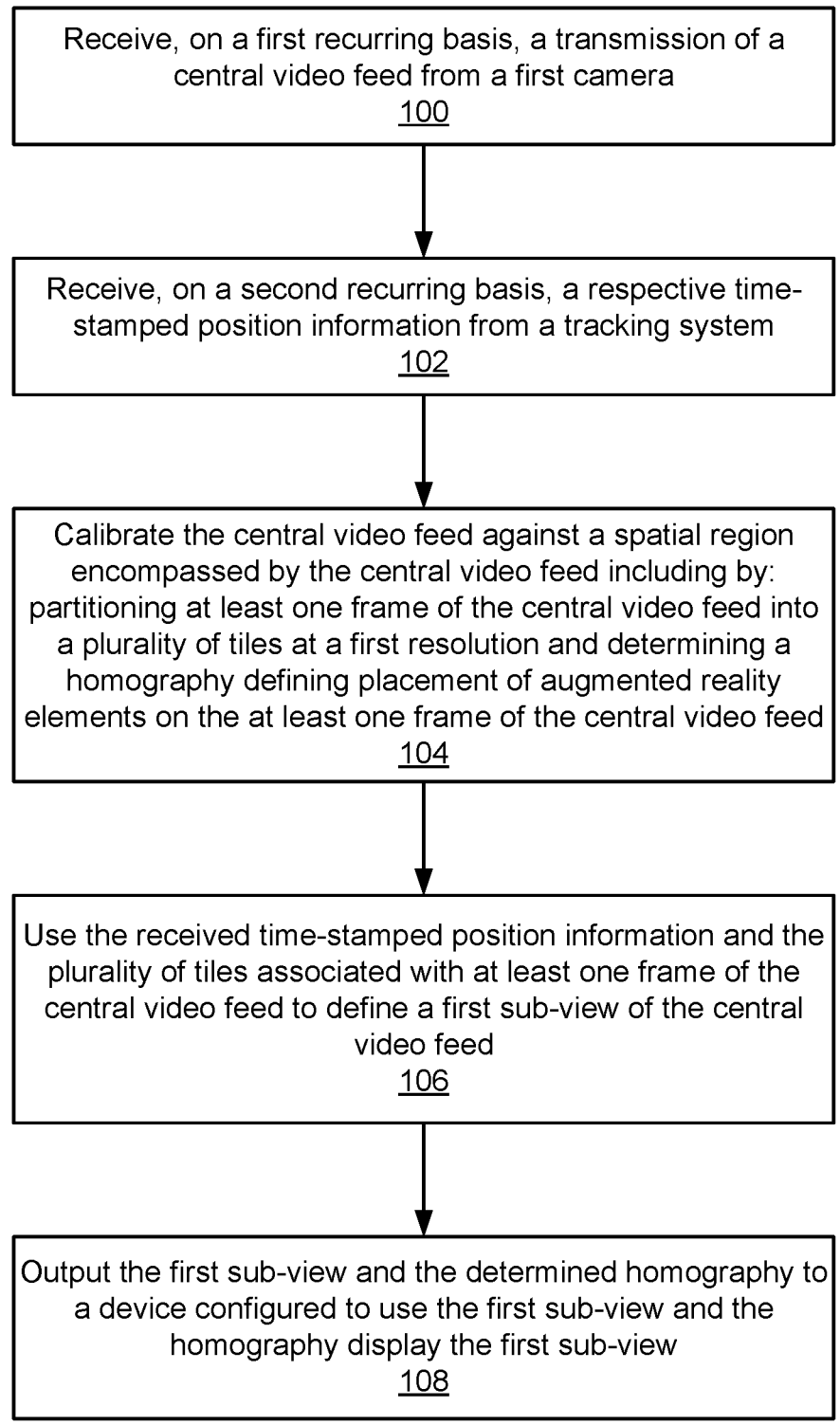
FIG. 1 is a flow diagram illustrating an embodiment of a process for adding augmented reality to a sub-view of a high resolution central video feed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for adding augmented reality to a sub-view of a high resolution central video feed are disclosed. In various embodiments, a high resolution central video feed is captured by a high resolution camera having a full view of a competition space. The high resolution central video feed can be partitioned into one or more sub-views. In various embodiments, a sub-view is an isolation shot of a portion of the competition space and can focus on one or more objects of interest such as a ball, player, or group of players. Using the example of a gridiron or North American football game, the high resolution central video feed captures at least the entire playing field. In various embodiments, the high resolution central video feed also captures areas along the side of the field of interest such as the bench or other an area where players or other objects of interest might be while not active on the field. The isolation shot can follow the ball, a specific player, a group of players, and/or other objects of interest. Augmented reality can be added to the isolation shot to enhance the viewing experience of a spectator of the football game (sometimes also called a user of the disclosed system). The augmented reality can more clearly show scrimmage lines, statistics associated with something that is happening during the game (such as the speed of a ball, shot percentage), advertising content, etc. Unlike conventional augmented reality components that get added to a sports event in a television broadcast, the augmented reality components added to the isolation shots according to the disclosed techniques can be tailored to the content of the isolation shots and/or the interests of a user. The augmented reality can be added either by a central server and then distributed to client devices, or locally by a client device using metadata transmitted by a central server.

The examples herein primarily use a gridiron or North American football game, but this is merely exemplary and not intended to be limiting as the techniques can be applied to a variety of sporting (and non-sporting) events that would benefit from capturing video of an area and then providing augmented reality for sub-views of the area.

The disclosed techniques find application in a variety of settings including, but not limited to: quickly and easily changing shots, defining a shot until an event happens to an object of interest (e.g., a ball is caught), and then following the object of interest (e.g., a player in possession of the ball). This improves the efficiency of capturing sporting events by complementing or replacing at least some of the traditional methods of capturing video of sporting events.

FIG. 1 is a flow diagram illustrating an embodiment of a process for adding augmented reality to a sub-view of a high resolution central video feed. This process may be implemented on a system such as the one shown in FIG. 5. In various embodiments, the process is implemented by isolation shot engine 514 in cooperation with augmented reality engine 512.

The process begins by receiving, on a first recurring basis, a transmission of a central video feed from a first camera (100). The central video feed refers to a series of one or more frames of video capturing a full view of a competition space. In other words, the central video feed encompasses an entire field of play and captures an entire scene. In some embodiments, the central video feed also captures areas adjacent to or associated with the competition space such as the bench or other an area where players or other objects of interest might be while not active on the field.

Figure 7:
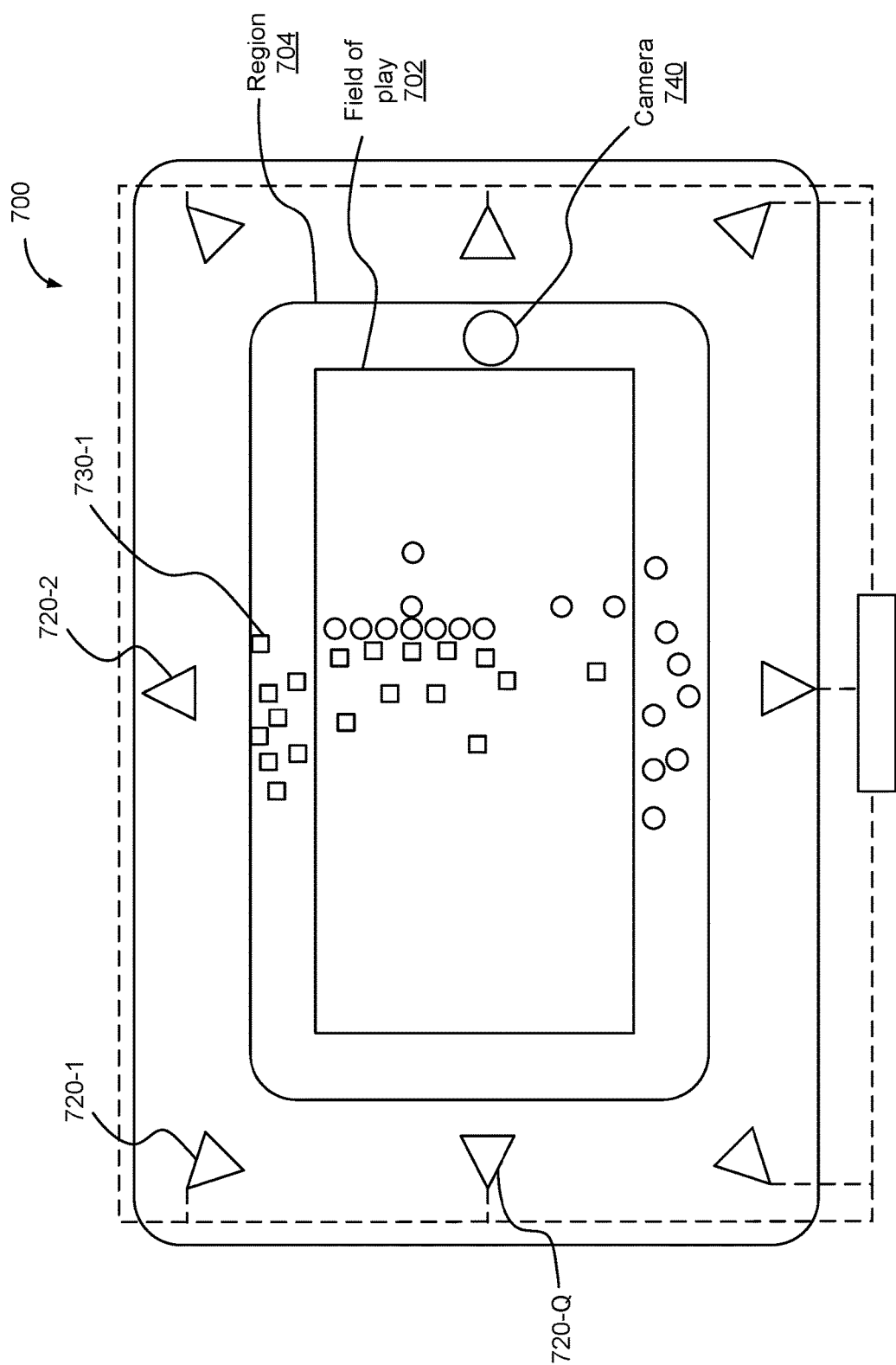
FIG. 7 shows an example environment including a field of play that includes components of a tracking according to an embodiment of the present disclosure.

Referring to FIG. 7, a central video feed is received from a first camera 740, for example. In some embodiments, the camera 740 is a fixed camera (e.g., the camera is limited in movement in at least one axis). For instance, in some embodiments the camera 740 is fixed such that the camera is capable of having a variable tilt, pan, and/or zoom, but is not able to be physically moved to another location. In some embodiments, the camera 750 is fixed such that the camera is not capable of moving in any axis and/or zoom. In some embodiments, the cameras are not fixed and field registration data can be used to obtain the orientation to apply an isolation camera effect.

The camera can be disposed in a variety of locations and orientations such as at a first end portion (e.g., a half court line, a 50-yard line) of a field of play in a landscape orientation or at a second end portion (e.g., an end zone, a goal) of a field of in a portrait orientation, among others. As further described herein, the camera may be configured to capture high resolution imagery (a high resolution central video feed) such that when partitioned into sub-views, the sub-views are of sufficient resolution to be displayed on a user's device such as smartphone. The camera 740 is in communication with a network in order to communicate with one or more devices and systems of the present disclosure.

In some embodiments, the central video feed comprises and/or is included in a plurality of central or other video feeds, each generated by one or more cameras located and oriented to generate video of at least a portion of the field of play. In some embodiments, the central video feed and/or another video feed may be generated at least in part by combining video data generated by a plurality of cameras, such as a composite or otherwise merged or combined video. In some embodiments, a plurality of cameras can be provided around the environment, each of which encompasses an entire field of play. Several central video feeds may be generated to allow for different angles and perspectives of the scene of play. A central video feed may include timestamps from each data stream to calibrate/coordinate the composition of scenes.

The process receives, on a second recurring basis, a respective time-stamped position information from a tracking system (102). In various embodiments, the time-stamped position information corresponds to a player or other object of interest. For example, a player can be a point in space and the amount of padding around the point defines a level of zoom around that player as further described herein.

Any tracking system may be used, and the one described for this example is merely exemplary and not intended to be limiting. In various embodiments, a tracking system includes tracking devices worn by a corresponding subject (e.g., players) participating in a competition in the spatial region or associated with other objects of interest (e.g., a ball). Respective time-stamped position information from each tracking device is received. For example, each tracking device transmits positional information that describes a time-stamped position of the corresponding subject in the spatial region.

An example of a tracking system and transmission of time-stamped position information is further described with respect to FIG. 7. Referring to FIG. 7, in one exemplary tracking system, an array of anchor devices 720 (e.g., anchor device 720-1, anchor device 720-2, . . . , anchor device 720-Q) receives telemetry data from one or more tracking devices associated with a respective subject or object of interest of the game. Subjects or objects of interest (represented by square and circles) may have one or more tracking devices attached to their body or otherwise monitoring their movements/behavior.

The process calibrates the central video feed against a spatial region encompassed by the central video feed (104). The process performs the calibration including by: partitioning at least one frame of the central video feed into a plurality of tiles at a first resolution, and determining a homography defining placement of augmented reality elements on the at least one frame of the central video feed.

The central video feed is calibrated against a spatial region represented in at least two dimensions that is encompassed by the central video feed. In some embodiments, the spatial region is a region that is captured by an array of anchor devices 720. The spatial region can be a field of play of a live sports event. In some embodiments, the calibration of the central video feed includes determining an equivalent portion of the central video feed for a coordinate system used by the positional information (e.g., telemetry data). Since standard fields of play of competitive sports include boundary lines of regulation, uniform length and thickness/widths (e.g., an out of bounds line, a half court line, a yard line, etc.), these lengths and thicknesses can be used to determine coordinate positions in the video feed. For instance, if a line on a field of play is known to have a uniform thickness (e.g., 6 centimeters thickness) and the thickness of the line in the central video feed is determined to reduce linearly from a first thickness to a second thickness, then an exact location of a subject with respect to the line can be determined in the central video feed.

Figure 5:
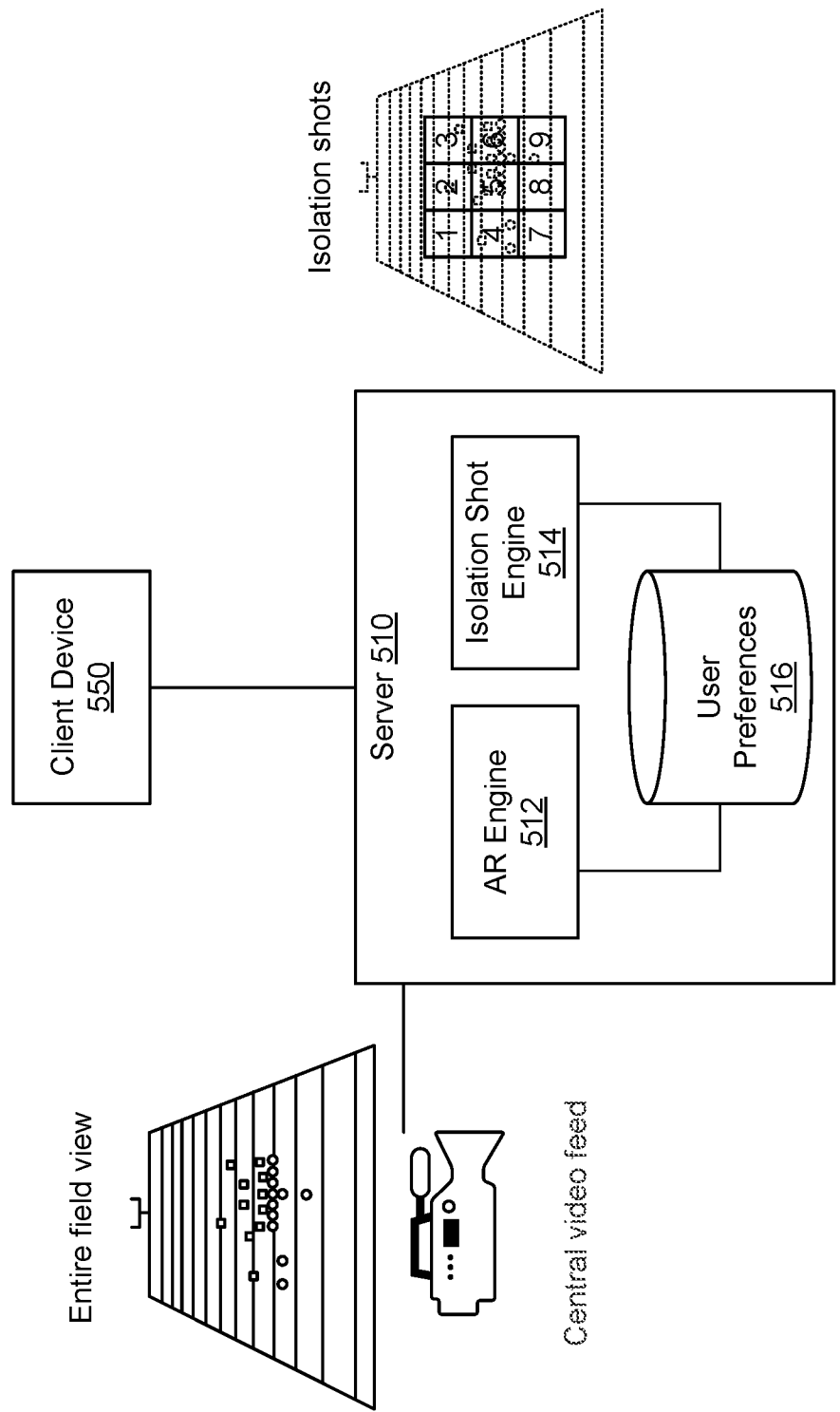
FIG. 5 is a block diagram illustrating an embodiment of a system for adding augmented reality to a sub-view of a high resolution central video feed.

In various embodiments, the process partitions at least one frame of the central video feed into a plurality of tiles at a first resolution. Referring briefly to FIG. 5, the central video feed, which captures an entire field of view is partitioned into nine tiles (labeled isolation shots in the figure). Each of the tiles captures a sub-view of the entire field of view. The number of tiles is merely exemplary and not intended to be limiting. Other examples include dividing an 8K frame of the high resolution camera feed into 16 (or more generally, n) segments, depending on a desired resolution. In various embodiments, the tiles are stored in a server, and a client requests a tile or subject/object of interest and the corresponding tile is delivered to the client. An example of partitioning at least one frame of the central video feed into a plurality of tiles at a first resolution is further described with respect to FIG. 5.

In various embodiments, camera calibration information can be used to determine a homography defining placement of augmented reality elements on at least one frame of the central video feed. Referring briefly to FIG. 5, AR engine 512 determines a homography and isolation shot engine 514 uses the determined homography to output information to client device 550. A client can use homography data or metadata to render an image with augmented reality elements incorporated into the image. An example of a process to use homography to place augmented reality elements on frame(s) of a central video feed is further described with respect to FIG. 3.

The process uses the received time-stamped position information and the plurality of tiles associated with at least one frame of the central video feed to define a first sub-view of the central video feed (106). In various embodiments, the first sub-view includes a subset of the plurality of tiles associated with at least one frame of the central video feed. The first sub-view is associated with a first set of one or more subjects. For example, the first sub-view may be associated with (include/show) a first subject of the plurality of subjects in the spatial region. The first sub-view comprises, for each of a plurality of frames comprising the central video feed, a corresponding sub-frame associated with the first set of subject(s). By way of non-limiting example, a sub-view defines a frame around a single player or multiple players, can follow an object of interest such as a ball, can follow one or more players at all times even when the player is not in the field of play (e.g., the player is on the bench), or can follow other subjects/objects of interest such as game officials. A player or object of interest can be followed by using metadata. The metadata is used to create an isolation shot on an on-going basis that creates the visual effect of a camera following the player or object of interest.

For example, in some embodiments, the process applies to each of a plurality of sequential frames of video data a mathematical transformation that is based at least in part on corresponding camera/video calibration data to determine, based on timestamp data comprising the received positional information and the positional information associated with each timestamp (e.g., XYZ coordinates of a subject A), a subset or portion of each sequential frame that is associated with the corresponding positional information of the subject A. The determined subsets/portions of the sequential frames are used to provide a sub-view of the central video feed associated with the subject A.

The sub-view is a different resolution from the central video feed in various embodiments. Despite being a different resolution, the quality difference is not necessarily noticeable to the average spectator so that the viewing experience remains enjoyable. For example, the central video feed is provided at a first resolution (e.g., a native resolution of the camera 140) such as between 2K and 12K. To this point, in some embodiments the central video feed includes a plurality of full two-dimensional frames (e.g., a first frame associated with a first time point, a second frame associated with a second time point, . . . , a nth frame associated with an nth time point). Each respective full two-dimensional frame in the plurality of full two-dimensional frames has a first dimension size and a second dimension size (e.g., a horizontal size and a vertical size such as a number of horizontal pixels and a number of vertical pixels). The first sub-view includes a corresponding sub-frame, for each respective full two-dimensional frame in the plurality of full two-dimensional frames. Each corresponding sub-frame is a portion of a corresponding full frame (e.g., sub-view/isolation shot 1 and sub-view/isolation shot 2 of FIG. 5 illustrates instantaneous sub-frames of the central video feed full frame (entire field view) of FIG. 5).

As described herein, a first sub-view of the central video feed can be defined at a second resolution that is less than the first resolution (the resolution of the tiles). For instance, the first resolution is at least four times, six times, or eight times the pixel resolution of a second resolution of a video that is partitioned from the central video feed.

A sub-view can have varying levels of zoom. The zoom can be defined around a player or object of interest by setting padding around the player as further described with respect to FIGS. 2A-2D.

In some embodiments, each sub-frame has a third dimension size and a fourth dimension size. Moreover, the third dimension size can be a fixed fraction of the first dimension size and the fourth dimension size is a fixed fraction of the second dimension size. For instance, the fixed fraction of the first dimension size and the fixed fraction of the second dimension size of a same fraction (e.g., 10%, 20%, 30%, . . . , 90%). Similarly, the fixed fraction of the first dimension size can be a first fraction and the fixed fraction of the second dimension size can be a second fraction different than the first fraction (e.g., the central video feed is captured in a landscape orientation and each sub-view is partitioned in a portrait orientation). By way of non-limiting example, (i) the first dimension size is 7680 pixels and the third dimension size is 3840 pixels, and the second dimension size is 4320 pixels and the fourth dimension size is 2160 pixels; or (ii) the first dimension size is 8192 pixels and the third dimension size is 3840 pixels, and the second dimension size is 4320 pixels and the fourth dimension size is 2160 pixels. In some embodiments each respective full two-dimensional frame in the plurality of full two-dimensional frames includes at least 10 megapixels to 40. In some embodiments a sub-view (e.g., the first sub-view) includes a corresponding sub-frame, for each respective full two-dimensional frame in the plurality of full two-dimensional frames, that includes less than 5 megapixels to 15 megapixels.

The coordinates of a center of the first sub-view within the central video feed changes over time, without human intervention, in accordance with a change over time in the position of the first subject as determined from recurring instances of the receiving that occur on the second recurring basis by the overlapping. In some embodiments, the center of the first sub-view is associated with position coordinates (e.g., XYZ) generated by a tracking device worn or otherwise associated with the subject. In some embodiments, a subject may wear multiple tracking devices and the first sub-view is centered based on a set of coordinates generated based on tracking data from the plurality of devices. For example, device data from multiple tracking devices worn by a subject may be correlated, e.g., based on timestamp data, and a geometric or other center set of coordinates may be computed based on the coordinates generated by the respective tracking devices.

In some embodiments, the first sub-view of the central video feed is communicated to a remote device (e.g., client device 550 of FIG. 5) independent of the central video feed. Accordingly, the communicating causes the remote device to display the first sub-view of the central video feed. By way of non-limiting example, the remote device is a handheld device such as a smart phone, a tablet, a gaming console, a fixed computer system such as a personal home computer, or the like. Moreover, the communicating can occur wirelessly (e.g., over a network).

In various embodiments, at least a first subject in the subset of subjects is selected. The selection of the at least first subject can be conducted via a computer system for example by an operator of the computer system (e.g., a video production specialist, a producer, a director, etc.), an end user of each respective remote device (e.g., via a respective user device 550), or automatically. For example, a first subject is selected automatically based at least in part on proximity (being within a threshold distance) to a ball or other subject (for example, a previously selected subject with which the subject is associated, such as in a one-on-one match or by being associated with complementary positions, such as opposing offensive and defensive linemen). Moreover, a sub-view may be selected from a wider collection of sub-views (e.g., a list of available sub-views, a preview of available sub-view, etc.). The wider collection of sub-views includes a sub-view for each player active in a competitive game (e.g., twenty-two sub-views for an American football game). This end-user selection allows for each user to select one or more subjects according to their desire. For instance, if the end-user has a list of favorite subjects spread across multiple teams, the end-user may view sub-views of each of these favorite subjects on a single remote device and/or display.

In some embodiments, an identity of the first subject is received at the remote device. For instance, the first sub view includes information related to the identity of the first subject (e.g., a name of the first subject). This identity of the respective subject allows for an end-user to quickly identify different sub views when viewing more than one sub view. In some embodiments, a tracking device is attached to (e.g., embedded within) a ball that is being used in the competitive sport on the spatial region. Accordingly, the identity of the first subject is determined, without human intervention, based on a determination of which subject in the plurality of subjects is currently closest to the ball using the respective transmission of time-stamped positional information from each tracking device.

The process outputs the first sub-view and the determined homography to a device configured to use the first sub-view and the homography display the first sub-view (108). In various embodiments, the client device uses a blank scene (empty field), player information (e.g., tracking information), and AR component information (the determined homography) to create a composite image showing the combination of the players on the field along with AR components. An example process for displaying the first sub-view including AR components is further described with respect to FIGS. 3 and 4.

In various embodiments, one or more steps of the process of FIG. 1 occurs during a live game in which the plurality of subjects is participating. However, the present disclosure is not limited thereto. For instance, the communicating can occur after a live game (e.g., such as viewing highlights of the live game or a replay of the live game).

Figure 2A:
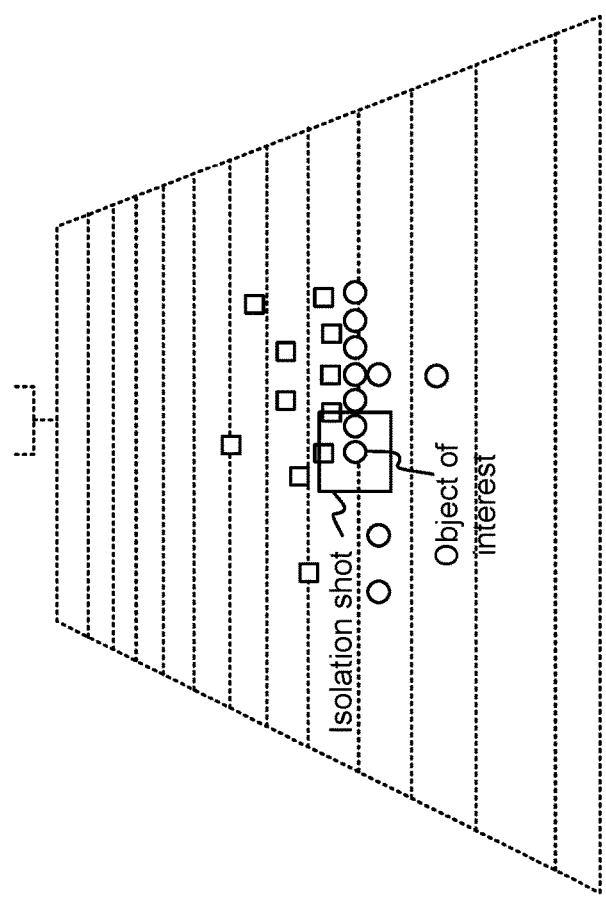
FIG. 2A shows an example of a sub-view obtained in various embodiments of the present disclosure.

FIG. 2A shows an example of a sub-view obtained in various embodiments of the present disclosure. For context, the entire field is shown in dashed lines in FIG. 2A. A sub-view (labeled isolation shot) is designated by the box around a subset of the players on the field. In this example, the object of interest is the player represented by the circle in the center of the isolation shot.

Figure 2D:
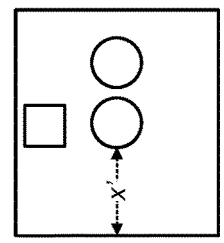
FIG. 2D shows an example of a sub-view at a third zoom level obtained in various embodiments of the present disclosure.
Figure 2C:
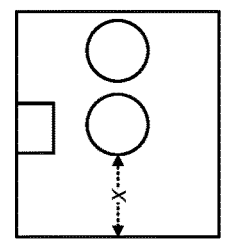
FIG. 2C shows an example of a sub-view at a second zoom level obtained in various embodiments of the present disclosure.
Figure 2B:
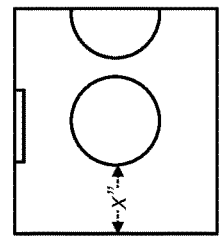
FIG. 2B shows an example of a sub-view at a first zoom level obtained in various embodiments of the present disclosure.

FIG. 2B shows an example of a sub-view at a first zoom level obtained in various embodiments of the present disclosure. The zoom is centered on the object of interest labeled in FIG. 2A. The object of interest is a point (defined by coordinates x, y or x, y, z) and the sub-view is centered on the point in various embodiments. The level of zoom is defined by the amount of padding surrounding the object of interest, here x".

FIG. 2C shows an example of a sub-view at a second zoom level obtained in various embodiments of the present disclosure. Compared with FIG. 2B, the sub-view here is more zoomed out so that the players look smaller/less detailed. Here, the padding around the object of interest is a different value (x) from the padding in FIG. 2B, which causes the zoom level to look different.

FIG. 2D shows an example of a sub-view at a third zoom level obtained in various embodiments of the present disclosure. Compared with FIG. 2C, the sub-view here is more zoomed out so that the players look smaller/less detailed. Here, the padding around the object of interest is a different value (x') from the padding in FIG. 2C, which causes the zoom level to look different.

Figure 3:
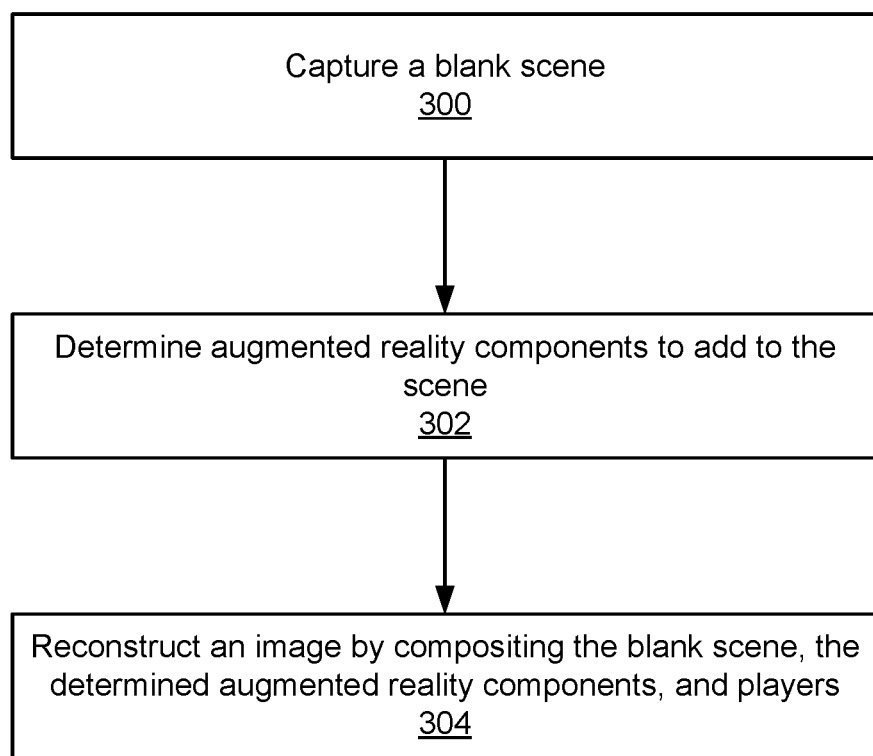
FIG. 3 is a flow diagram illustrating an embodiment of a process for compositing a sub-view including augmented reality.

FIG. 3 is a flow diagram illustrating an embodiment of a process for compositing a sub-view including augmented reality. The process can be performed by the system of FIG. 5. The process of FIG. 3 will be explained using FIGS. 4A and 4B.

Figure 4A:
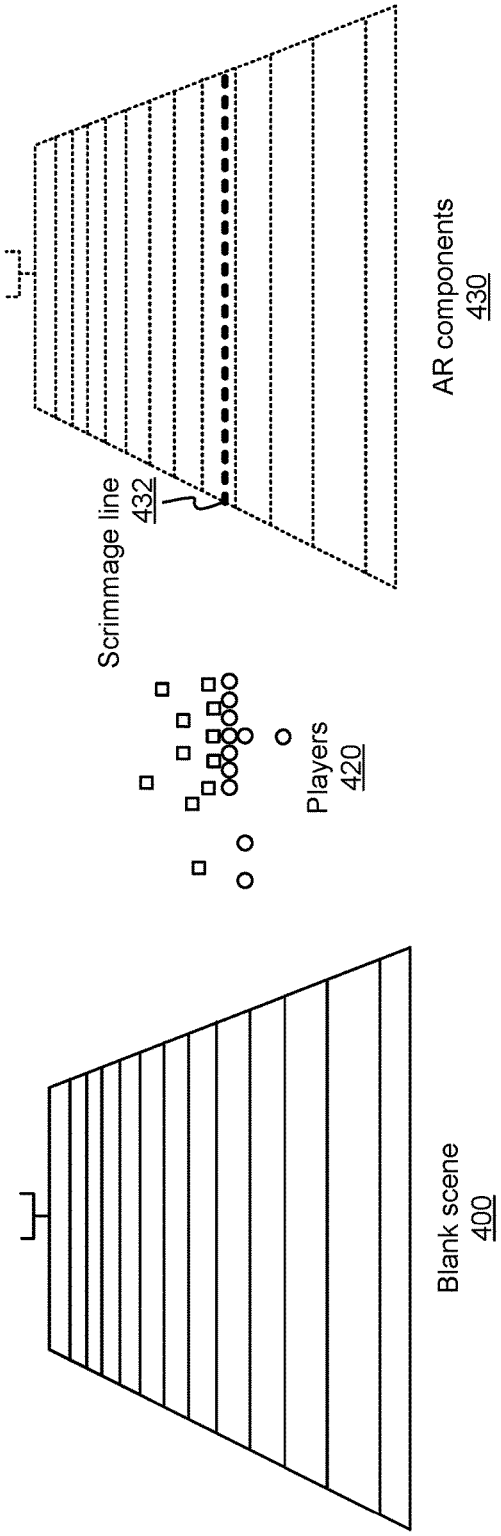
FIG. 4A shows an example of components for constructing a composite image according to various embodiments of the present disclosure.

FIG. 4A shows an example of components for constructing a composite image according to various embodiments of the present disclosure. The components include a blank scene 400, players 420, and augmented reality components 430. The blank scene 400 shows the field of play without any players on the field. For example, the players 420 can be determined by subtracting or otherwise removing the blank scene 400 from a frame capturing a scene of the players on the field (which may also use tracking data as further described herein). The AR components 430 include any component that augments a frame of video. In this example, the AR components is scrimmage line 432. It can be displayed in a visually distinguished way such as highlighted color to help a user more clearly see the scrimmage line.

Figure 4B:
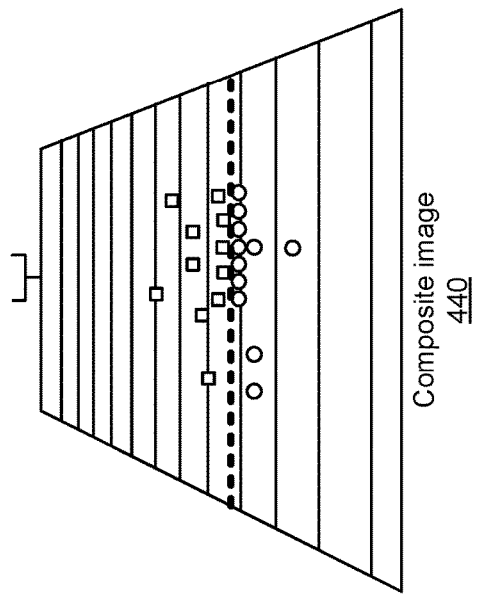
FIG. 4B shows an example of a composite image obtained by combining components according to various embodiments of the present disclosure.

FIG. 4B shows an example of a composite image obtained by combining components according to various embodiments of the present disclosure. This composite image is obtained by combining the blank scene 400, players 420, and AR components 430.

Returning to FIG. 3, the process begins by capturing a blank scene (300). The blank scene 400 can be captured by a camera such as camera 740 prior to any players entering the field. The blank scene can be a baseline or reference frame for other frames such as frames of video showing various states of game play.

The process determines augmented reality components to add to the scene (302). The augmented reality components can be determined based on predetermined settings or user interests. For example, a scrimmage line enhances the user experience of all users and thus this AR component can be determined for all frames. The components can be determined based on the positions of the players 420 by determining, based on tracking data, a location where the ball is placed after the end of the most recent play and taking into account any penalty yards. Users may be interested in other information such as statistics for a specific player. The statistics can be determined and added to the scene as an AR component, for example in the corner of the display. Referring briefly to FIG. 5, AR engine 512 is configured to determine the AR components in various embodiments.

The process reconstructs an image by compositing the blank scene, the determined augmented reality components, and players (304). The process creates a composite image by combining (superimposing, for example) the players 420 onto the blank scene 400 and then any AR components 430 on top.

Referring briefly to FIG. 5, client device 550 is configured to create a composite image in various embodiments. Alternatively, server 510 is configured to create a composite image and send the composite image and/or related data to the client device 550.

FIG. 5 is a block diagram illustrating an embodiment of a system for adding augmented reality to a sub-view of a high resolution central video feed. The system includes a server 510 and a client device 550. The client device 550 can be smartphone, computer, or other device on which one or more frames of video is rendered.

The server 510 includes AR engine 512 and isolation shot engine 514. A user preferences store 516, configured to store user preferences and/or profiles, may be provided locally on the server as shown or remotely. AR engine 512 is configured to determine one or more AR components to be displayed on frame(s) of video data. The AR components can be based on user preferences or known preferences of an audience. For example, a scrimmage line is helpful when rendered to visualize a current state of play and can be determined as an AR component and added to a frame of video. Other AR components can be more user-specific, depending on interests of the user such as a user who is a fan of a specific player or group of players. Isolation shot engine 514 is configured to perform a process such as the one of FIG. 1 to determine a sub-view centered on player(s)/object(s) of interest.

Figure 6:
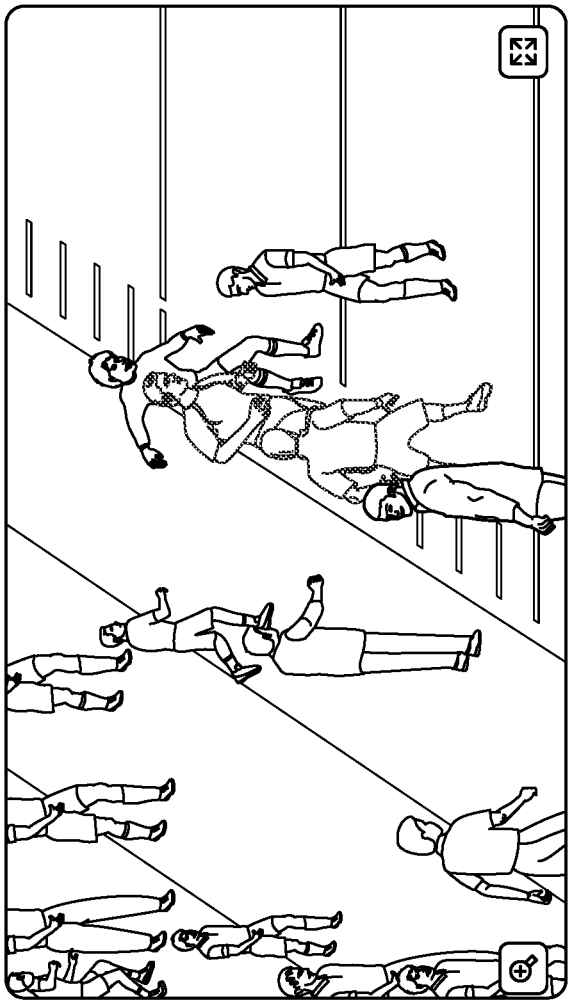
FIG. 6 shows an example of a graphical user interface for adding augmented reality to a sub-view of a high resolution central video feed according to an embodiment of the present disclosure.

FIG. 6 shows an example of a graphical user interface for adding augmented reality to a sub-view of a high resolution central video feed according to an embodiment of the present disclosure. The graphical user interface includes a plays panel 610, a video panel 650, and a player panel 680.

Plays panel 610 displays various plays associated with a sporting event currently displayed in the video panel 650. The sporting event can be viewed live or after the event has concluded. Specific plays can be viewed by selecting a corresponding play in the plays panel. In this example, the user is viewing a specific play identified by play ID 195. Associated information is displayed such as the time of the beginning of the play and the state of the play including which player (if any) is in possession of the ball. In some embodiments, the time of the beginning of the play and/or state of play information is determined automatically, e.g., by processing video content using artificial intelligence, machine learning, and/or related techniques. In some embodiments, the play start time and/or state of play information may be wholly or partly entered as input by a human worker.

Video panel 650 displays video of a sporting event. The video can be a sub-view that is generated using the disclosed techniques. The sub-view can be a composite image including players and AR components. The video can be maximized to fill an entire screen by selecting the icon on the bottom right of the video. There are also various options displayed along the top of the video panel. In this example, the user can select the angle of the video feed. Here, the video is from an 8K camera on the high left of the field. There may be other video feeds available having different resolutions and/or in different positions around the field. Another option is the type of filter to apply to the video. In this example, the default is broadcast shading. Other filters include black and white or other color schemes. The filtering can be performed locally at a client device. The AR drop down menu enable a user to select one or more AR components to be rendered on the video panel 650.

Although not shown here, an AR component such as a scrimmage line can be displayed in the video panel. The AR component can be customized to the user. For example, the color of the scrimmage line can be according to a preference of the user. Unlike conventional scrimmage lines displayed in a television broadcast, a scrimmage line determined according to techniques of the present disclosure is more accurate because a viewport (making up the tiles, and can be thought of a virtual camera) is moved.

The locations and number of menus is merely exemplary and not intended to be limiting. For example, the menus may instead be displayed on the sides or bottom of the video panel.

The player panel 680 shows a least a portion of the team rosters. Here, player 15, the quarterback for KC is highlighted because the user is interested in this player. The video panel 650 is displaying a sub-view centered on player 15. The user can select one or more other players to view sub-views associated with the other players. The user can select "clear all" to reset customization/personalization.

FIG. 7 shows an example environment including a field of play that includes components of a tracking according to an embodiment of the present disclosure. The system is an example of one that can capture a central video feed used at 100 and collect time-stamped position information used at 102.

An environment 700 includes a field of play 702 in which a game is played (e.g., a football game). The environment 700 includes a region 704 that includes the field of play 702 and an area immediately surrounding the field of play (e.g., an area that includes subjects not participating in the game such as subject 730-1). The environment 700 includes an array of anchor devices 720 (e.g., anchor device 720-1, anchor device 720-2, ..., anchor device 720-Q) that receive telemetry data from one or more tracking devices associated with a respective subject of the game. As illustrated in FIG. 7, in some embodiments the array of anchor devices is in communication with a telemetry parsing system. Moreover, in some embodiments one or more cameras 740 capture images and/or video of the sports event, which is used in forming the virtual reproduction.

The camera 740 is a high resolution camera capable of capturing video at a high resolution such as 12K or other higher resolutions available on the market. In various embodiments, the camera may have a variety of lens including those with less linear distortion, which is suitable for dividing the central video feed into sub-views and minimizing distortion in the sub-views. In various embodiments, the camera captures an image of the field at a relatively high camera angle.

As described herein, the central video feed can be divided into sub-views, where padding defines a level of zoom of the sub-view. Because the central video is high resolution, the sub-views can be displayed on a user device at a varying levels of zoom without being too grainy. In FIG. 7, square markers represent subjects a first team of the game while circular markers represents subjects of a second team of the game.

A respective transmission of time-stamped positional information (e.g., telemetry data 230) is received from each tracking device 300 in a plurality of tracking devices. The recurring basis of receiving the transmission of time-stamped positional information can be a ping rate (e.g., instantaneous ping rate 310 of FIG. 3) of a respective tracking device 300. In some embodiments, transmission of time-stamped positional information from each tracking device in a plurality of tracking devices occurs at a bandwidth of greater than 500 MHz or a fractional bandwidth equal to or greater than 0.20. By way of non-limiting example, the transmission of time-stamped positional information from each tracking device in a plurality of tracking devices is within 3.4 GHz to 10.6 GHz, each tracking device 300 in the plurality of tracking devices has a signal refresh rate of between 1 Hz and 60 Hz, and/or the recurring basis is between 1 Hz and 60 Hz. Each tracking device 300 of the plurality of tracking devices sends a unique signal that is received by the receiving, identifying a respective tracking device. Each tracking device can transmit biometric data (e.g., biometric telemetry 236) specific to a respective subject associated with the respective tracking device if biometric data is collected.

Each tracking device 300 is worn by a corresponding subject in a plurality of subjects that is participating in a competition on the spatial region. Further, each tracking device 300 transmits positional information (e.g., telemetry data 230) that describes a time-stamped position of the corresponding subject in the spatial region. In some embodiments, there are at least two tracking devices 300 worn by each subject in the plurality of subjects. Each additional tracking device 300 associated with a corresponding subject reduces an amount of error in predicting an actual location of the subject.

In some embodiments, the plurality of subjects includes a first team (e.g., a home team) and a second team (e.g., an away team). In some embodiments, the first team and/or the second are included in a league of teams (e.g., a football league, a basketball association, etc.). The first team includes a first plurality of players (e.g. a first roster of players) and the second team includes a second plurality of players (e.g., a second roster of players). Throughout various embodiments of the present disclosure, the first team and the second team are engaged in a competitive game (e.g., a live sport event), such as a football game or a basketball game. Accordingly, the spatial region is a field of play of the competitive game, such as a football field or a basketball court. In some embodiments, the subjects of the present disclosure are players, coaches, referees, or a combination thereof that are associated with a present game.

In some embodiments, each time-stamped position in an independent plurality of time-stamped positions for a respective player of the first or second plurality of players includes an xyz-coordinate of the respective player with respect to the spatial region. For instance, in some embodiments the spatial region is mapped such that a center portion of the spatial region (e.g., half court, 50-yard line, etc.) is an origin of an axis and a boundary region of the spatial region (e.g., an out of bounds line) is a maximum or minimum coordinate of an axis. In some embodiments, the xyz-coordinate has an accuracy of ±5 centimeters, ±7.5 centimeters, ±10 centimeters.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to:
receive a transmission of a central video feed from a first camera; and
receive a respective time-stamped position information from a tracking system; and
a processor coupled to the communication interface and configured to:
calibrate the central video feed against a spatial region encompassed by the central video feed including by:
partitioning at least one frame of the central video feed into a plurality of tiles at a first resolution; and
determining a homography defining placement of augmented reality elements on the at least one frame of the central video feed;
use the received time-stamped position information and the plurality of tiles associated with at least one frame of the central video feed to define a first sub-view of the central video feed, wherein the first sub-view corresponds to a portion of the spatial region encompassed by the central video feed; and
output the first sub-view and the determined homography to a device configured to use the first sub-view and the homography to display the first sub-view.

2. The system of claim 1, wherein:
the first sub-view is associated with a first subject of a plurality of subjects in the spatial region; and
the first subject of the plurality of subjects in the spatial region includes at least one player or object of interest.

3. The system of claim 1, wherein the first sub-view includes a plurality of subjects.

4. The system of claim 1, wherein:
the first sub-view includes a subset of the plurality of tiles associated with at least one frame of the central video feed; and
the subset of the plurality of tiles is selected based at least in part on a first subject associated with the first sub-view.

5. The system of claim 1, wherein the central video feed includes a full view of the spatial region and the spatial region includes a competition space.

6. The system of claim 1, wherein the first sub-view of the central video feed includes an isolation shot of a portion of the spatial region.

7. The system of claim 1, wherein the first sub-view includes a plurality of video frames depicting a first subject.

8. The system of claim 1, wherein the first sub-view includes a plurality of video frames centered on a first subject.

9. The system of claim 1, wherein the first sub-view is zoomable and a level of zoom is based at least in part on padding surrounding a first subject.

10. The system of claim 1, wherein partitioning at least one frame of the central video feed into a plurality of tiles at a first resolution includes dividing the at least one frame into a predetermined number of tiles based at least in part on a desired resolution.

11. The system of claim 1, wherein the augmented reality elements include a scrimmage line.

12. The system of claim 1, wherein the augmented reality elements include statistics associated with a competition corresponding to the central video feed.

13. The system of claim 1, wherein the augmented reality elements includes content customized to a user.

14. The system of claim 1, wherein the processor is configured to:
capture a blank scene; and
determine augmented reality elements to add to the scene.

15. The system of claim 1, wherein the device is configured to use the first sub-view and the homography to display the first sub-view including by reconstructing an image by compositing a blank scene, the augmented reality elements, and a first subject.

16. The system of claim 1, wherein the first camera is fixed.

17. The system of claim 1, wherein the first camera captures the central video feed at a resolution of at least 12K.

18. The system of claim 1, wherein the device is configured to use the first sub-view and the homography to display the first sub-view including by displaying a graphical user interface including a plays panel, a video panel including the first sub-view, and a player panel.

19. A method, comprising:
receiving a transmission of a central video feed from a first camera;
receiving a respective time-stamped position information from a tracking system;
calibrating the central video feed against a spatial region encompassed by the central video feed including by:
partitioning at least one frame of the central video feed into a plurality of tiles at a first resolution; and
determining a homography defining placement of augmented reality elements on the at least one frame of the central video feed;
using the received time-stamped position information and the plurality of tiles associated with at least one frame of the central video feed to define a first sub-view of the central video feed, wherein the first sub-view corresponds to a portion of the spatial region encompassed by the central video feed; and
outputting the first sub-view and the determined homography to a device configured to use the first sub-view and the homography to display the first sub-view.

20. A computer program product embodied in a non-transitory computer readable medium and comprising computer instructions for:
receiving a transmission of a central video feed from a first camera;
receiving a respective time-stamped position information from a tracking system;
calibrating the central video feed against a spatial region encompassed by the central video feed including by:
partitioning at least one frame of the central video feed into a plurality of tiles at a first resolution; and
determining a homography defining placement of augmented reality elements on the at least one frame of the central video feed;
using the received time-stamped position information and the plurality of tiles associated with at least one frame of the central video feed to define a first sub-view of the central video feed, wherein the first sub-view corresponds to a portion of the spatial region encompassed by the central video feed; and
outputting the first sub-view and the determined homography to a device configured to use the first sub-view and the homography to display the first sub-view.

\* \* \* \* \*